US012769197B2

(12) United States Patent
Grening

(10) Patent No.: US 12,769,197 B2
(45) Date of Patent: Oct. 20, 2026

(54) WRIST-BAND FOR A WEARABLE DEVICE

(71) Applicant: ENDLESS TECHNOLOGIES LTD., Ramat Gan (IL)

(72) Inventor: Shawn Grening, Portland, OR (US)

(73) Assignee: ENDLESS TECHNOLOGIES LTD., Ramat Gan (IL)

( * ) Notice: Subject to any disclaimer, the term of this patent is extended or adjusted under 35 U.S.C. 154(b) by 408 days.

(21) Appl. No.: 17/908,779

(22) PCT Filed: Feb. 19, 2021

(86) PCT No.: PCT/US2021/018689
§ 371 (c)(1),
(2) Date: Sep. 1, 2022

(87) PCT Pub. No.: WO2021/178146
PCT Pub. Date: Sep. 10, 2021

(65) Prior Publication Data

US 2023/0127672 A1 Apr. 27, 2023

Related U.S. Application Data

(60) Provisional application No. 62/983,779, filed on Mar. 2, 2020.

(51) Int. Cl.

| | |
|---|---|
| ***G03B 30/00*** | (2021.01) |
| ***A44C 5/00*** | (2006.01) |
| ***G04G 21/02*** | (2010.01) |
| ***G06F 1/16*** | (2006.01) |

(52) U.S. Cl.
CPC .............. *G03B 30/00* (2021.01); *A44C 5/003* (2013.01); *G04G 21/02* (2013.01); *G06F 1/163* (2013.01)

(58) Field of Classification Search
CPC ...... G03B 30/00; G03B 17/561; G03B 29/00; A44C 5/003; G04G 21/00; G04G 21/02; G04G 17/04; G04G 17/08; G06F 1/163; G06F 1/1686
See application file for complete search history.

(56) References Cited

U.S. PATENT DOCUMENTS

| | | | |
|---|---|---|---|
| 10,129,503 | B1 | 11/2018 | Kim et al. |
| 2015/0063075 | A1 | 3/2015 | Baek et al. |
| 2017/0000222 | A1 | 1/2017 | Lee et al. |

FOREIGN PATENT DOCUMENTS

| | | |
|---|---|---|
| KR | 10-2015-0026387 A | 3/2015 |

OTHER PUBLICATIONS

International Search Report of PCT/US2021/018689 dated May 5, 2021 [PCT/ISA/210].
Written Opinion of PCT/US2021/018689 dated May 5, 2021 [PCT/ISA/237].
Communication dated Nov. 10, 2025 in Korean Application No. 10-2022-7033617.

*Primary Examiner* — Edwin A. Leon
(74) *Attorney, Agent, or Firm* — Sughrue Mion, PLLC

(57) ABSTRACT

A device for attaching a replaceable imaging device to a wrist of a user, the device including a strip including a band and/or a band part, the strip adapted to wrap around a human limb, the strip including a cavity, the cavity being opened towards the human limb, and an imaging device, the imaging device having the shape of the cavity of the strip and adapted to be installed in the cavity of the strip, where the strip has one or more holes and the imaging device has at least one lens arranged to fit against at least one of the holes.

8 Claims, 4 Drawing Sheets

WRIST-BAND FOR A WEARABLE DEVICE

FIELD

The method and apparatus disclosed herein are related to the fields of wearable devices, and more particularly but not exclusively, to wearable computing devices, and more particularly but not exclusively, to wearable imaging devices.

BACKGROUND

Wearable electronic devices are known, as well as wearable imaging devices, including imaging devices worn on the wrist. Such devices are usually provided to the user with an article, such as a band, used to attach the device to the user, particularly the wrist. However, a user may need to wear more than one wearable electronic device on the same wrist, such as a smartwatch and a camera, which the known articles do not support. There is thus a widely recognized need for, and it would be highly advantageous to have, a system and method for a wristband that may accommodate a replaceable smartwatch as well as a separate replaceable camera, on the same wrist band, overcoming the above limitations.

SUMMARY OF THE INVENTION

According to one exemplary embodiment, there is provided a device for attaching a replaceable imaging device to a wrist of a user, the device including a strip including a band and/or a band part, the strip adapted to wrap around a human limb, the strip including a cavity, the cavity being opened towards the human limb, and an imaging device, the imaging device having the shape of the cavity of the strip and adapted to be installed in the cavity of the strip, where the strip has one or more holes and the imaging device has at least one lens arranged to fit against at least one of the holes.

According to another exemplary embodiment, the device additionally includes a closure for closing the cavity and for securing the imaging device inside the cavity.

According yet to another exemplary embodiment, the strip includes a first band part that includes the cavity and a first end part that includes a connector to connect to a watch or a smartwatch, and a second end part including a connector to connect to a second band part, where the second band part includes a third end part including a connector to connect to the watch or smartwatch, and a fourth end part including a connector to connect to the second end part of the first band part.

According still to another exemplary embodiment, there is provided a device for attaching a replaceable imaging device to a wrist of a user, the device including a strip including a band and/or a band part, the strip adapted to wrap around a human limb, the strip further includes a cavity, the cavity being opened towards the human limb, where the shape of the cavity is adapted to a shape of an imaging device, and where the cavity has at least one hole adapted for a lens of the imaging device.

Further, according to another exemplary embodiment, there is provided a device for attaching a replaceable imaging device to a wrist of a user, the device including an imaging device having the shape of the cavity of a band, the imaging device adapted to be installed in the cavity of the band, the imaging device having at least one lens arranged to fit against a corresponding hole within the band surrounding the cavity, wherein the band is adapted to wrap around a human limb, the band including a cavity, the cavity being opened towards the human limb.

Unless otherwise defined, all technical and scientific terms used herein have the same meaning as commonly understood by one of ordinary skill in the relevant art. The materials, methods, and examples provided herein are illustrative only and not intended to be limiting. Except to the extent necessary or inherent in the processes themselves, no particular order to steps or stages of methods and processes described in this disclosure, including the figures, is intended or implied. In many cases the order of process steps may vary without changing the purpose or effect of the methods described.

BRIEF DESCRIPTION OF THE DRAWINGS

Various embodiments are described herein, by way of example only, with reference to the accompanying drawings. With specific reference now to the drawings in detail, it is stressed that the particulars shown are by way of example and for purposes of illustrative discussion of the preferred embodiments only, and are presented in order to provide what is believed to be the most useful and readily understood description of the principles and conceptual aspects of the embodiment. In this regard, no attempt is made to show structural details of the embodiments in more detail than is necessary for a fundamental understanding of the subject matter, the description taken with the drawings making apparent to those skilled in the art how the several forms and structures may be embodied in practice.

In the drawings.

DESCRIPTION OF THE EMBODIMENTS

Figure 1:
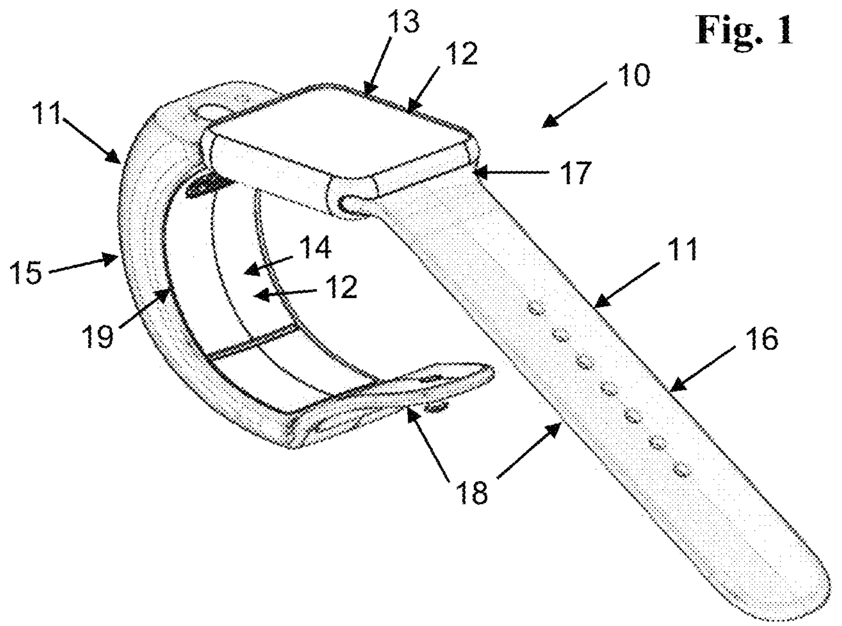
FIG. 1 is a simplified illustration of a wearable complex including a wearable article and two computational devices.

The present embodiments comprise a wearable article for attaching a computational device to a user. Particularly, the wearable article has means to contain the computational device inside the wearable article. Particularly, the wearable article has means to remove and replace the computational device.

Before explaining at least one embodiment in detail, it is to be understood that the embodiments are not limited in its application to the details of construction and the arrangement of the components set forth in the following description or illustrated in the drawings. Other embodiments may be practiced or carried out in various ways. Also, it is to be understood that the phraseology and terminology employed herein is for the purpose of description and should not be regarded as limiting.

In this document, an element of a drawing that is not described within the scope of the drawing and is labeled with a numeral that has been described in a previous drawing has the same use and description as in the previous drawings. Similarly, an element that is identified in the text by a numeral that does not appear in the drawing described by the text, has the same use and description as in the previous drawings where it was described.

The drawings in this document may not be to any scale. Different figures may use different scales and different scales can be used even within the same drawing, for example different scales for different views of the same object or different scales for the two adjacent objects.

Reference is now made to FIG. 1, which is a simplified illustration of a wearable complex 10 including a wearable article 11 and two computational devices 12, according to one exemplary embodiment.

As shown in FIG. 1, wearable complex 10 may be designed to be warn on a user's limb, such as a user's extremity, such as a user's wrist. Thus, wearable complex 10 may include wearable article 11 in the form of a strip or a wrist-band arranged to attach the wearable complex 10 to a user's wrist, and one or more computational devices 12.

For example, wearable complex 10 may include a first computational device 12 such as a computerized watch, or a smartwatch, designated by numeral 13, and a second computational device 12 such as an imaging device designated by numeral 14.

As shown in FIG. 1, wearable complex 10 may include wearable article 11 including one or more band parts such as a first band part 15 and a second band part 16. Both the first band part 15 and the second band part 16 may include a connector 17 to connect the respective band part to the computerized watch 13 on either side of the computerized watch 13. First band part 15 and the second band part 16 may also include a respective buckle part 18 to connect the first band part 15 to the second band part 16. The first band part 15, or second band part 16 (or both) may also include the imaging device 13.

As shown in FIG. 1, wearable complex 10, via wearable article 11, may include a cavity 19, for example, within first band part 15. Cavity 19 may be arranged with its opening towards the user's wrist. The imaging device 14 may be inserted into cavity 19, via the cavity opening, before the wearable complex 10 is warn on the user's wrist so that the imaging device 14 may be secured between the cavity 19 and the user's wrist.

Figure 2A:
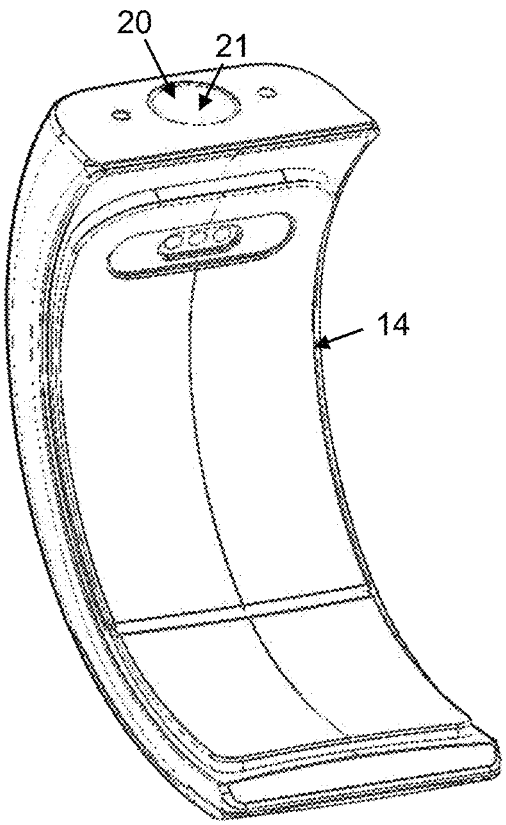
FIG. 2A is a simplified illustration of an imaging device from the inward (wrist) side.
Figure 2B:
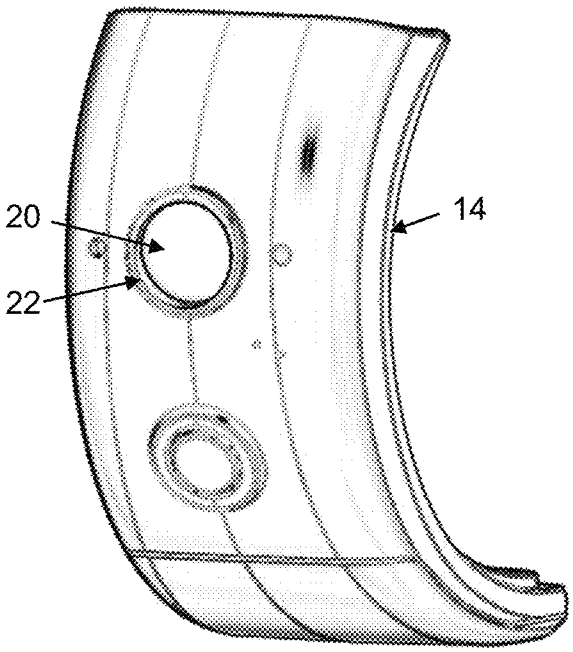
FIG. 2B is a simplified illustration of the imaging device from the outward side.
Figure 2C:
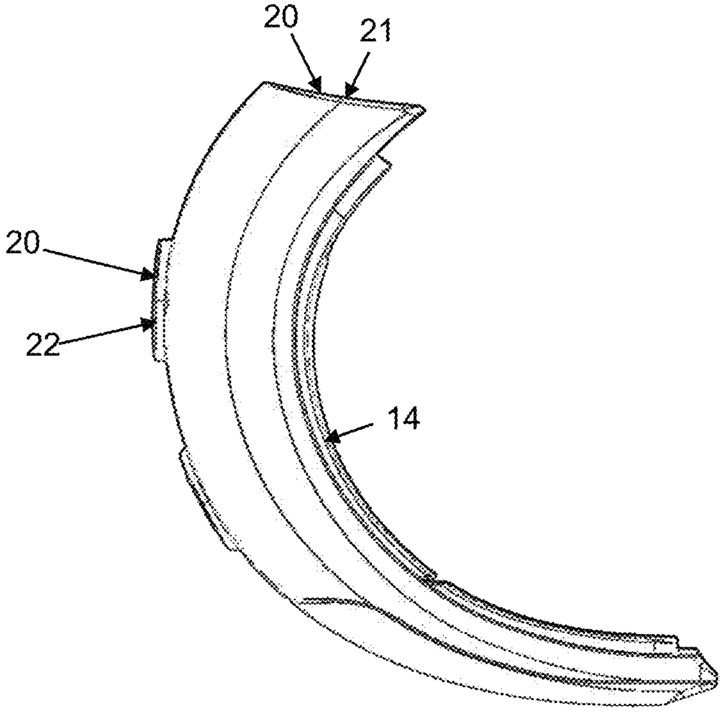
FIG. 2C is a side view of the imaging device.

Reference is now made to FIG. 2A, which is a simplified illustration of imaging device 14 from the inward side, and to FIG. 2B, which is a simplified illustration of imaging device 14 from the outward side, and to FIG. 2C, which is a side view of imaging device 14, according to one exemplary embodiment.

FIG. 2A shows imaging device 14 from the side facing the wrist, and that FIG. 2B shows imaging device 14 from the side away from the wrist. As an option, the illustrations of FIG. 2A, FIG. 2B, and FIG. 2C may be viewed in the context of the previous Figures. Of course, however, the illustrations of FIG. 2A, FIG. 2B, and FIG. 2C may be viewed in the context of any desired environment. Further, the aforementioned definitions may equally apply to the description below.

Imaging device 14 may include one or more imaging sensors 20 such as a camera. For example, imaging device 14 may include a first imaging sensor (camera) 20 designated by numeral 21 and oriented in a first direction, such as outwards, substantially away from the user, and a second imaging sensor (camera) 20 designated by numeral 22 and oriented in a second direction (e.g., inwards, substantially towards the user). Imaging device 14 may be inserted into cavity 19 of wearable complex 10 and/or first band part 15.

Reference is now made to FIG. 3A, FIG. 3B, FIG. 3C, and FIG. 3D, which are simplified illustrations of a first band part 15 including cavity 19, according to one exemplary embodiment.

As an option, the illustrations of FIG. 3A, FIG. 3B, FIG. 3C, and FIG. 3D, may be viewed in the context of the previous Figures. Of course, however, the illustrations of FIG. 3A, FIG. 3B, FIG. 3C, and FIG. 3D, may be viewed in the context of any desired environment. Further, the aforementioned definitions may equally apply to the description below.

It is appreciated that cavity 19 is illustrated as a part of first band part 15 as an example, and that cavity 19 may be part of second band part 16.

It is appreciated that cavity 19 has the shape of imaging device 14 and/or imaging device 14 has the shape of cavity 19.

As shown in FIGS. 3A, 3B, 3C, and 3D, first band part 15 may include one or more openings 23, such as a hole, to expose a respective imaging sensor (camera) 20 of imaging device 14, and particularly, to expose a lens of imaging sensors 20. Consequently, imaging device 14 may include at least one sensor (camera) having a lens arranged to fit against the respective openings 23 (hole) in cavity 19.

The first band part 15 may also include a connector element 24 to connect to computational device 12, such as the a first computational device 13, such as a smart watch. The connector 24 may be included at an end of the first band part 15.

The first band part 15 may also include a connector, such as a buckle part 18, to connect to the second band part 16. The buckle part 18 may be included at an end of the first band part 15, such as the end opposite to connector 24.

The second band part 16, similarly to the first band part 15, may include a third end part including a connector to connect to computational device 12, such as the a first computational device 13, such as a smart watch, and a fourth end part including a connector to connect to the buckle part 18 of the first band part 15. Therefore, the wearable complex 10, including the first band part 15, the computational device 12, and the second band part 16, may be wrapped around a user's wrist.

Figure 3A:
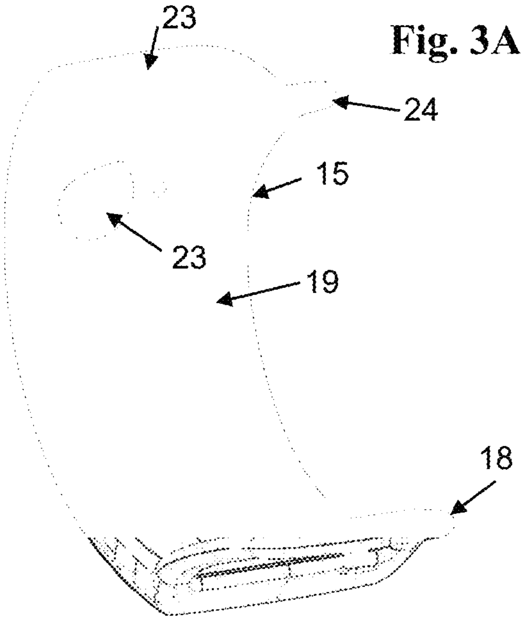
FIG. 3A is simplified illustration of a first view of a first band part including cavity.
Figure 3B:
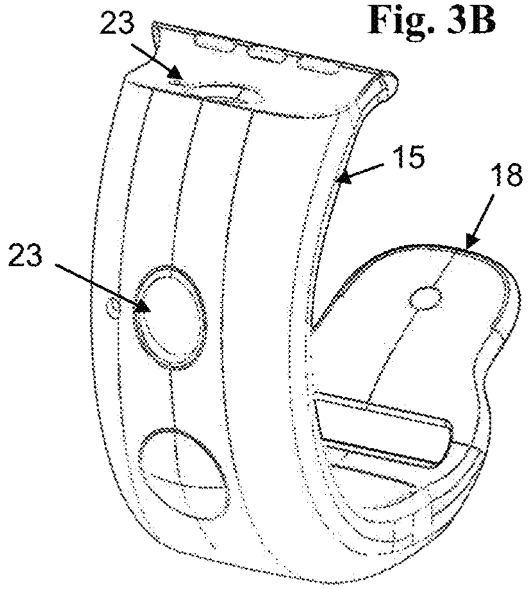
FIG. 3B is simplified illustration of a second view of the first band part including cavity.
Figure 3C:
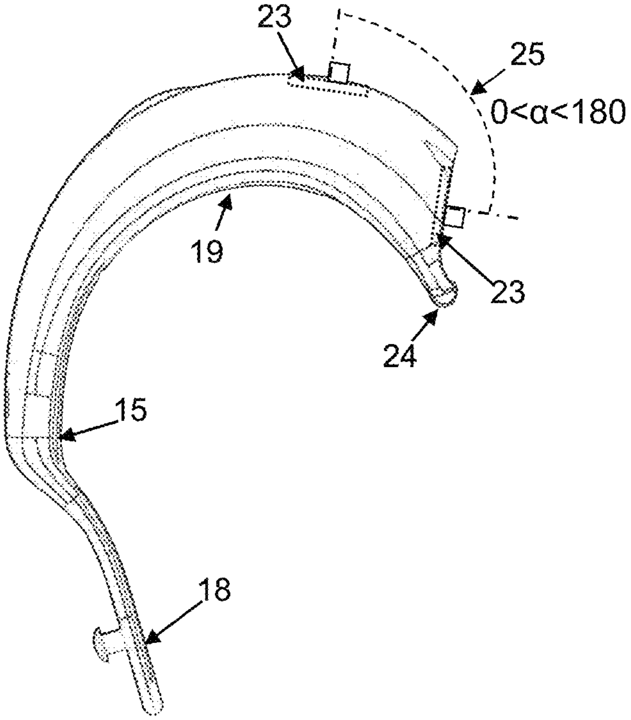
FIG. 3C is simplified illustration of a side view of the first band part including cavity.
Figure 3D:
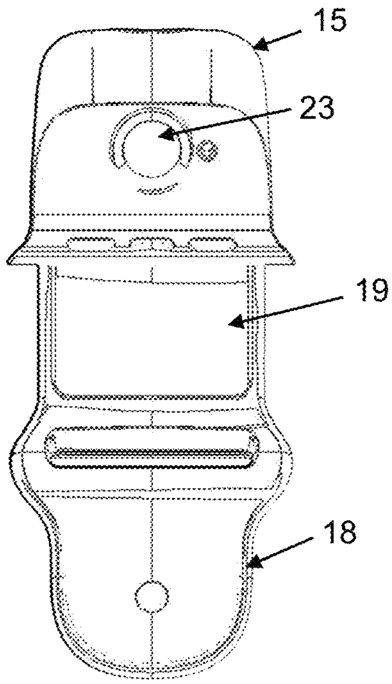
FIG. 3D is simplified illustration of an inner view of the first band part including cavity.

As shown in FIG. 3C, cavity 19 may include two openings 23 (hole) for the two imaging sensors 20 (e.g., cameras) with an angle 25 between the openings 23. As shown in FIG. 3C, angle 25 may be measured between the respective axes that are each perpendicular to the area of the respective opening 23 at the center of the opening 23. Alternatively, angle 25 may be measured between the respective plains of openings 23. As shown in FIG. 3C, angle 25 may have a value that is larger than zero and smaller than 180 degrees. Particularly, angle 25 may have a value between 30 and 120 degrees.

It is appreciated that the angle between the optical axes of the lenses of the respective two imaging sensors 20 is equal to angle 25. The optical axis of imaging sensor 20 being measured as the perpendicular to the area of the lens at the center of the lens.

As shown in FIG. 1, at least one of the imaging sensors 20 may be mounted with an angle between the imaging sensor 20 and the plain of the screen display of the computerized watch (smartwatch) 13. The angle being measured, for example, between the optical axis of the imaging device and the perpendicular to the surface of the screen display. This angle may be larger than zero and smaller than 90 degrees.

Altogether, the wearable article 11, and particularly the first band part 15 on which the two imaging sensors 20 are mounted, may have the shape where the two openings 23, and therefore the lenses of the two imaging sensors 20, are arranged with an angle between the cameras and the plain of the screen display of the computerized watch (smartwatch) 13 that is larger than zero and smaller than 90 degrees, and an angle 25 between the two imaging sensors 20 that is larger than zero and smaller than 180 degrees.

Figure 4:
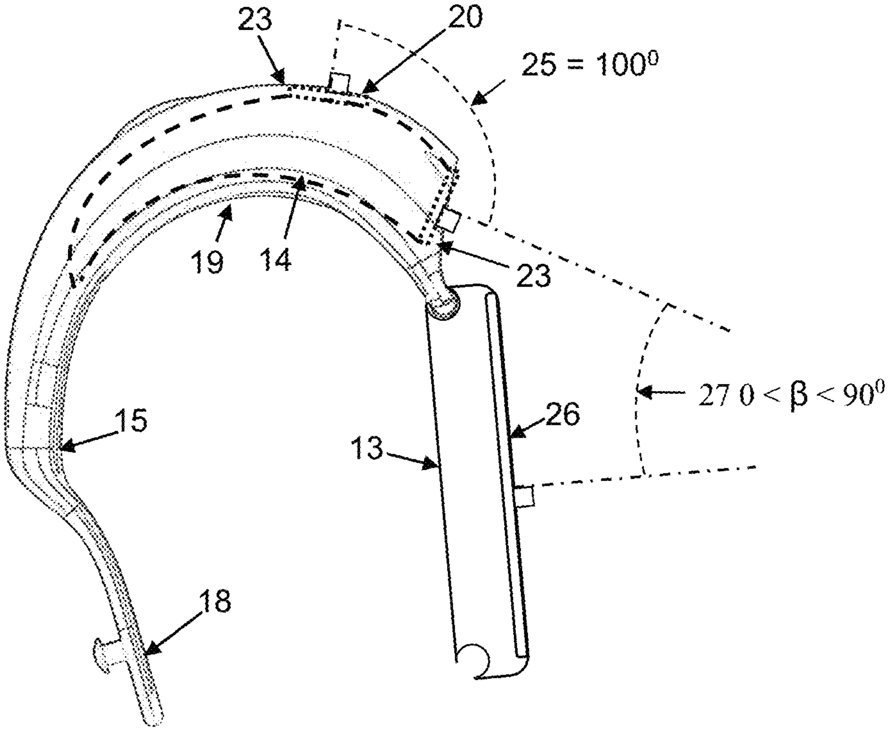
FIG. 4 is a simplified illustrations of first band part 15 attached to first computational device 13 and including second computational device 14 in cavity 19.

Reference is now made to FIG. 4, which is simplified illustrations of first band part 15 attached to first computational device 13 and including second computational device 14 in cavity 19, according to one exemplary embodiment.

As an option, the illustration of FIG. 4, may be viewed in the context of the previous Figures. Of course, however, the illustrations of FIG. 4, may be viewed in the context of any desired environment. Further, the aforementioned definitions may equally apply to the description below.

Computational device 13 may be a computerized watch, or a smartwatch, which may include a display 26. The second computational device 14 may be an imaging device and may include two imaging sensors 20. The first band part 15 may include cavity 19, which may include two openings 23 adapted for the two imaging sensors 20. As an example, the two openings 23 of FIG. 4 are arranged with an angle of 90 degrees between the planes of the openings 23. As an example, the two imaging sensors 20 of second computational device 14 may be arranged with an angle (25) of 100 degrees between the planes of the lenses of imaging sensors 20 (or between the optical axes if imaging sensors 20). Hence, an opening 23 may be adapted to allow the plane of the lens to be in an angle to the plane of the opening.

As shown in FIG. 4, at least one of the openings 23 and/or imaging sensors 20 may be in an angle 27 to the plane of display 26. Angle 27, between the optical axis of imaging sensors 20 and the perpendicular to the plane of display 26, may have a value that is greater zero and less than 90 degrees.

For example, one of the imaging sensors 20 may have an angle between zero and 90 degrees between its optical axis and the perpendicular to the to the plane of display 26, and the other imaging sensors 20 may have an angle between 90 and 180 degrees between its optical axis and the perpendicular to the to the plane of display 26.

It is appreciated that certain features, which are, for clarity, described in the context of separate embodiments, may also be provided in combination in a single embodiment. Conversely, various features, which are, for brevity, described in the context of a single embodiment, may also be provided separately or in any suitable sub-combination.

Although descriptions have been provided above in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art.

What is claimed is:

1. A device comprising:

a strip comprising at least one of a band and a band part, the strip adapted to wrap around a human limb, the strip comprising a cavity, the cavity being opened towards the human limb; and an imaging device, the imaging device having a same shape of the cavity of the strip and adapted to be installed in the cavity of the strip so as to entirely fill the cavity and so the imaging device installed in the cavity is always opened towards the human limb;

wherein the cavity has at least one opening and the imaging device has at least one lens arranged to fit against the opening.

2. The device according to claim 1 wherein the strip comprises:

a first band part comprising the cavity, wherein the first band part comprises a first end part comprising a connector to connect to a watch part and a second end part comprising a connector to connect to a second band part; and the second band part comprising a third end part comprising a connector to connect to a watch part, and a fourth end part comprising a connector to connect to the second end part of the first band part.

3. The device according to claim 1 additionally comprising at least one of:

wherein the at least one opening comprises two openings mounted with an angle between the openings, wherein the angle is larger than zero degrees and smaller than 180 degrees;

wherein the at least one imaging device comprises two imaging devices mounted with an angle between the imaging devices, wherein the angle is larger than zero degrees and smaller than 180 degrees; and wherein the device additionally comprises a display, and wherein at least one of the at least one opening and the at least one imaging device is mounted with an angle to the display that is larger than zero degrees and smaller than 90 degrees.

4. A device comprising:

an imaging device having a same shape of a cavity of a band, the band comprising a cavity, the cavity being opened towards the human limb, the imaging device adapted to be installed in the cavity of the band so as to entirely fill the cavity and so the imaging device installed in the cavity is always opened towards the human limb, the imaging device having at least one lens arranged to fit against a corresponding opening within the band surrounding the cavity, wherein the band is adapted to wrap around a human limb, the band comprising a cavity.

5. The device according to claim 4 additionally comprising at least one of:

wherein the at least one imaging device comprises two imaging devices mounted with an angle between the openings, wherein the angle is larger than zero degrees and smaller than 180 degrees; and wherein the device additionally comprises a display, and wherein the at least one imaging device is mounted with an angle to the display that is larger than zero degrees and smaller than 90 degrees.

6. A method comprising:

at least one of providing and acquiring a strip comprising at least one of a band and a band part, the strip adapted to wrap around a human limb, the strip comprising a cavity, the cavity being opened towards the human limb;

at least one of providing and acquiring an imaging device, the imaging device having a same shape of the cavity of the strip and adapted to be installed in the cavity of the strip; and installing the imaging device inside the cavity of the strip so as to entirely fill the cavity and so the imaging device installed in the cavity is always opened towards the human limb;

wherein the strip has at least one opening and the imaging device has at least one lens arranged to fit against the opening.

7. The method according to claim 6 additionally comprising:

at least one of providing and acquiring a wearable device comprising at least one of a watch, a timepiece, a processor, and a smartwatch, wherein the wearable device has at least one end part adapted to couple to a band for securing the wearable device to a part of a human body;

at least one of providing and acquiring the strip, wherein the strip additionally has at least one end part adaptive to couple to the wearable device; and coupling the strip to the wearable device.

8. The method according to claim 6 additionally comprising at least one of:

providing the strip with two openings arranged with an angle between the openings, wherein the angle is larger than zero degrees and smaller than 180 degrees;

providing the imaging device comprising two imaging devices mounted with an angle between the imaging devices, wherein the angle is larger than zero degrees and smaller than 180 degrees; and providing a display, wherein at least one of the at least one opening and the at least one imaging device is mounted with an angle to the display that is larger than zero degrees and smaller than 90 degrees.

* * * * *